April 7, 1953 M. F. BATES 2,633,925
ROTOR HUB MOUNTING FOR A ROTARY WING AIRCRAFT
Filed Sept. 20, 1946 3 Sheets-Sheet 1
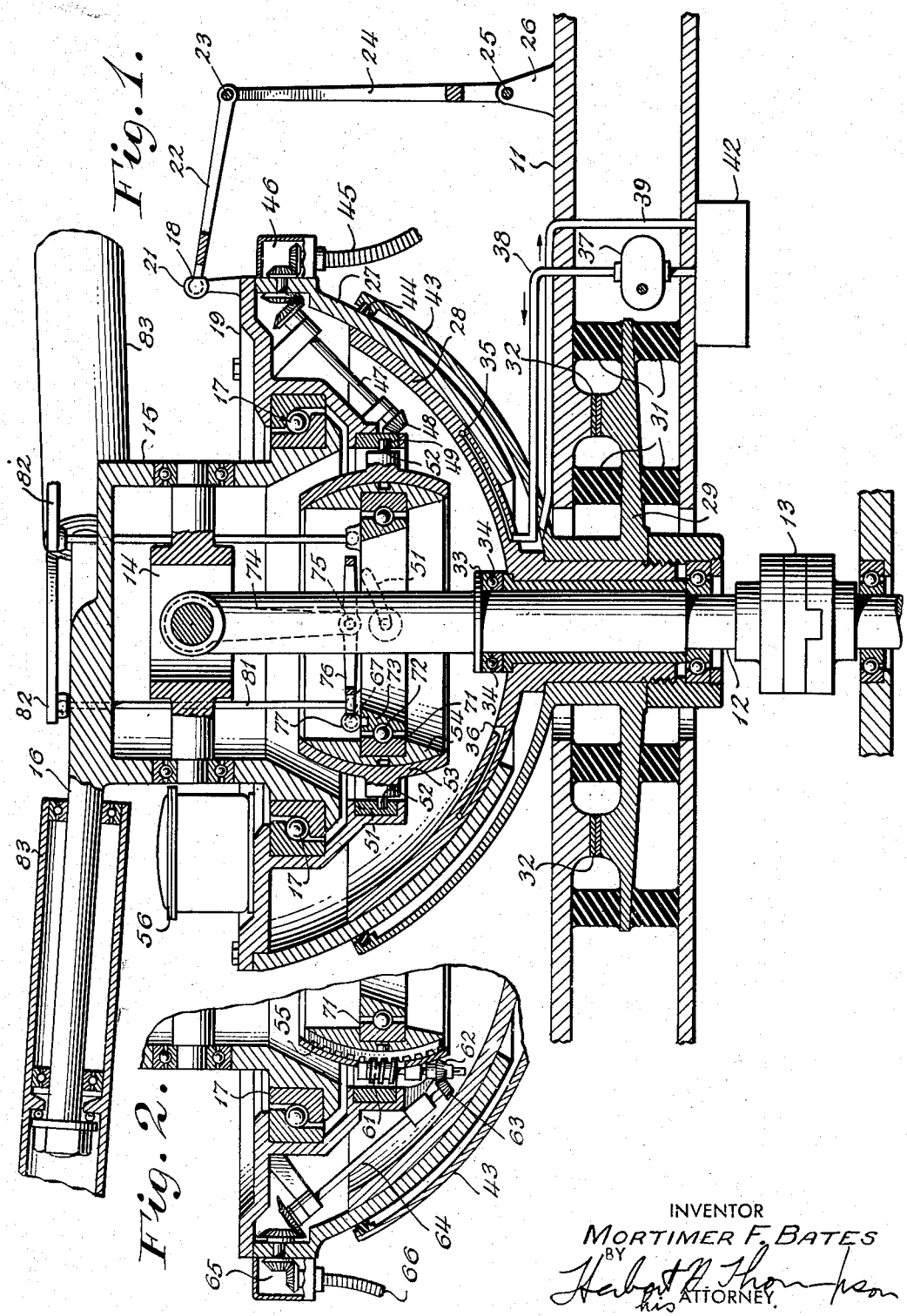
INVENTOR
MORTIMER F. BATES
BY
Herbert A. Thompson
his ATTORNEY

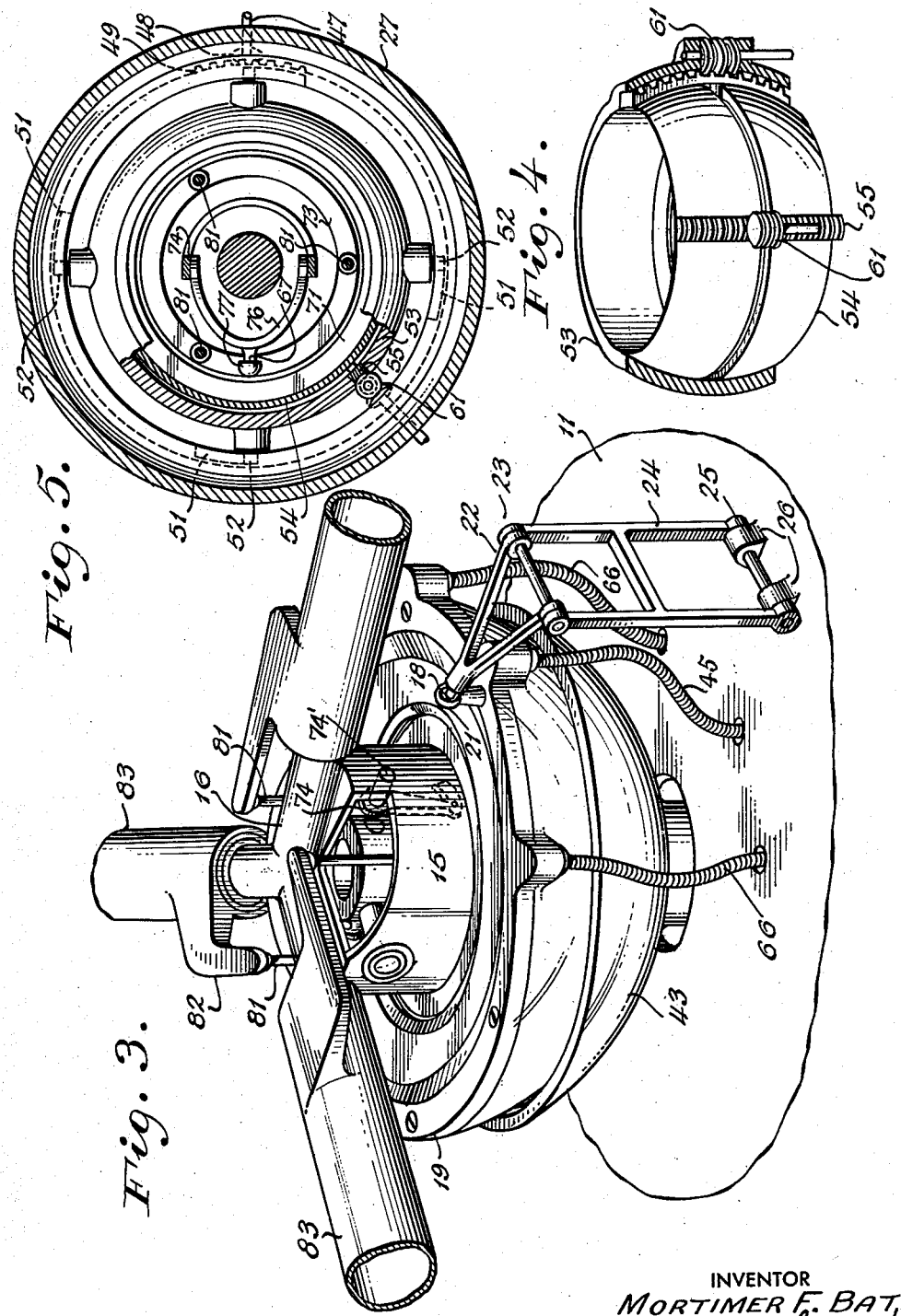

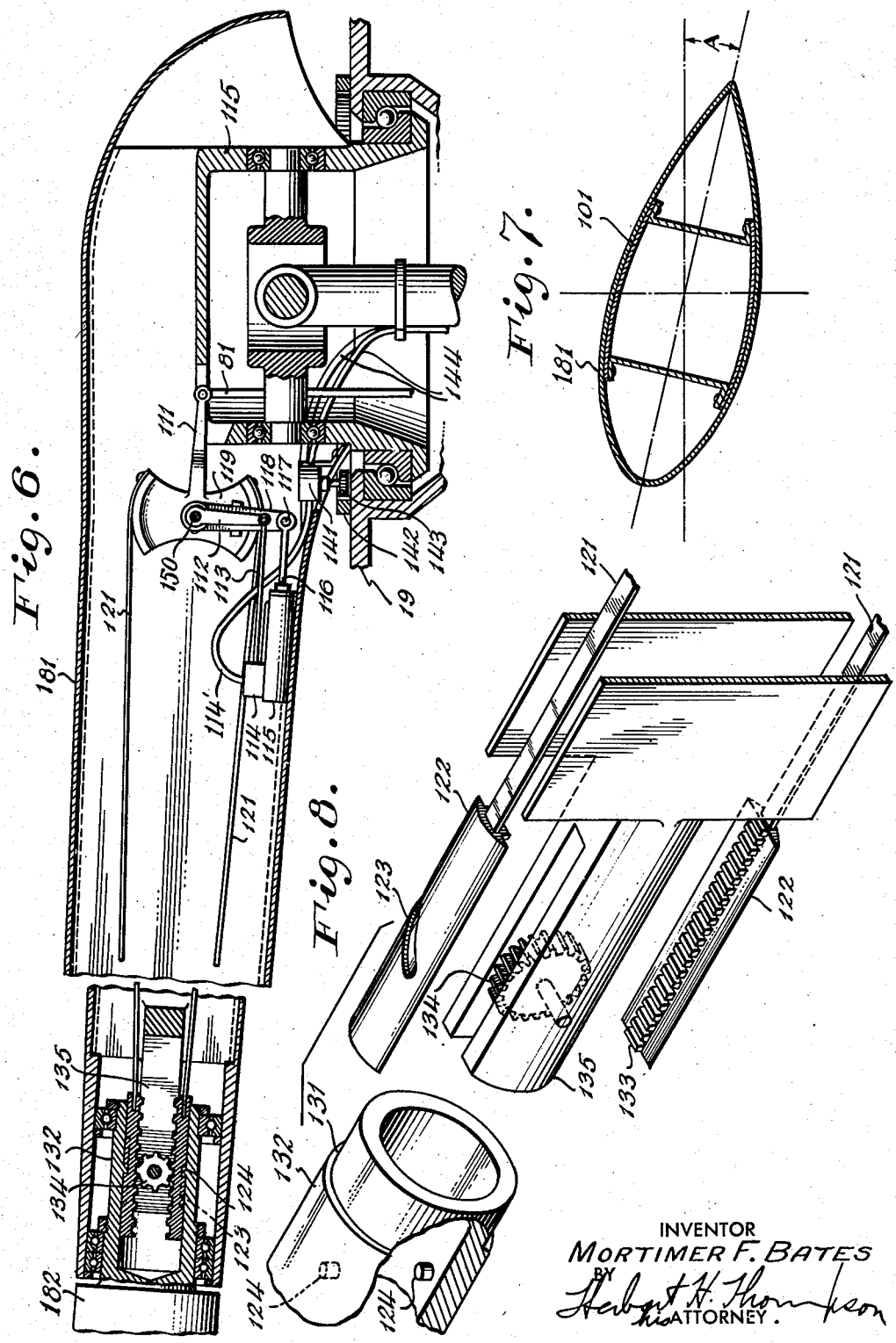

Patented Apr. 7, 1953

2,633,925

UNITED STATES PATENT OFFICE 2,633,925

ROTOR HUB MOUNTING FOR A ROTARY WING AIRCRAFT

Mortimer F. Bates, Brooklyn, N. Y., assignor to The Sperry Corporation, a corporation of Delaware Application September 20, 1946, Serial No. 698,199

8 Claims. (Cl. 170—160.26)

This invention relates to rotary wing aircraft, and, in particular, to improvements in the sustaining means and rotor head therefor. It is proposed herein to provide an aircraft, of the rotary wing type, with a rotor mounted to be tiltable in any direction, and with wings pivotally mounted on the rotor to be movable in pitch.

In accordance with the instant invention, a rotor is mounted on the fuselage of a rotary wing craft to be relatively tiltable thereto, in an amount slightly greater than the relative tilt expected to be encountered in flight. Novel bearing means are provided for transmitting the lift from the sustaining means to the aircraft fuselage for any condition of rotor tilt.

Another principal feature of this invention resides in providing a wing arrangement wherein the rotary wings may be pivotally mounted on stub shafts that are, in turn, rigidly mounted on a crown member. The rotor may be of a type wherein the entire blade is movable in pitch, but is otherwise rigid with the crown member, or may be of a cantilever type having a through box spar construction uniting a plurality of wings into one rigid structure. Means supplementing manual pitch control, such as a hydraulic booster mechanism, may be incorporated within the wing root. Said booster mechanism may be empowered through rotation of the rotor relative to a non-rotatable disc tiltably mounted on said rotor.

Further features reside in arranging the non-rotatable disc or flat ring, to be tiltable with the rotor and constantly parallel to the plane of the wing tip path, thereby affording a mounting for vertical reference instruments, rendering said instruments completely free of spurious fuselage motion and also serving to provide a direct and positive means for ascertaining the flight attitude of the wings with the reference to the horizon for all conceivable positions of the rotor.

Other objects and advantages will become apparent from the specification, taken in connection with the accompanying drawings wherein:

Fig. 1 is a cross section of the sustaining means embodying the instant invention;

Fig. 2 is a further detail particularly illustrating means for obtaining cyclical pitch control;

Fig. 3 is a perspective view showing the sustaining means having stub shafts pivotally mounting the rotating wings;

Fig. 4 is a perspective, partly in section, showing the spherical segments utilized in obtaining cyclical pitch control;

Fig. 5 is a cross section taken through a horizontal plane about midway through the pitch control mechanisms;

Fig. 6 is a cross section illustrating the two-segment wings;

Fig. 7 is a cross section, through the inner wing, illustrating the through box spar arrangement; and Fig. 8 is a perspective view showing the mechanism for obtaining pitch control of the outer wing segment.

Now referring to Fig. 1, the fuselage of the aircraft 11 has an opening through which the driving shaft 12 is extended from the Oldham coupling at 13. At the top of the drive shaft 12 is located a universal joint 14 on which the crown member or rotor hub 15 is mounted to be tiltable in any direction. On the rotor hub 15 a plurality of stub shafts 16 may be mounted. These stub shafts are arranged to have a fixed coning angle with each other. The built-in coning angle being a well known method of reducing bending moments in a rigid lift rotor structure.

The rotor hub 15 has a peripheral ball bearing arrangement 17 in which a plurality of ball bearings are mounted. Through this arrangement, lift that is obtained from the wings is transmitted through the ball bearing arrangement 17 and therefrom to the disc or ring 19. This ring 19 is provided with means for preventing rotation thereof and this means comprises a ball socket 21 rigidly mounted on ring 19 and supporting the lever arm 22 through a ball member 18 within the socket 21. The arm 22 is attached through pivot 23 to the lever arm 24 and thence, through the pivot 25 to the bracket arm 26 which, in turn, is rigidly mounted on the fuselage 11. Thus, the ring 19 is prevented from rotation, but is nevertheless free to tilt in response to the tilt produced in the rotor hub 15. Furthermore, because the stub shafts 16 are rigidly mounted on the rotor hub 15, ring 19 will be constantly parallel to any plane that may be selected equidistant from the center of the hub through the stub shafts 16 or any extensions thereof, and, in particular, ring 19 will be constantly parallel to the plane of the wing tip path, or normal to the virtual axis of rotation.

The ring 19 has affixed thereto a member or shell 27 in the form of a spherical segment and having an opening at its lower extremity, as it appears in the drawing, to permit passage of the shaft 12. The opening of the shell 27 is sufficient to permit tilt in the order of 7½° in either direction. Thus, the rotor hub tilt is sufficient to accommodate any tilt that may be incurred during flight and the rotor hub tilt is transmitted to the ring 19 and through it to shell 27.

The inner surface of shell 27 is a bearing surface and cooperates with the outer surface of a second member or shell 28 which is also in the form of a spherical segment and has an origin concentric with that of shell 27 and coincident with the axis of universal joint 14. The lift from the rotor hub is transmitted through the shell 27, through the bearing surface between members 27 and 28 and thereon into shell 28. The shell 28 has a cylindrical extension at the bottom thereof which extends down into the fuselage 11 and is there rigidly attached to a flange 29 which, in turn, is mounted within the fuselage 11 on the rubber shock mounts 31—31 to be resilient to horizontal vibrational movements.

Angular movements of the flange 29 are prevented by a plurality of contact pads 32—32. These pads 32—32 are mounted on the fuselage 11 and on the flange 29 in a manner to permit free horizontal movement.

The shaft 12 is provided with the flange 33 which, in turn, rests on a ball bearing 34 through which the weight of the entire sustaining means is transmitted to the fuselage during a condition of rest of the sustaining means.

From the foregoing, it will be seen that when the sustaining means provides lift either through forced rotation or autorotation, this lift is transmitted from the rotating wings through the stub shafts 16 through the rotor hub 15, through the connecting bearings 17, through the ring 19 and its associated member 27 to the member 28 and thence, through the flange 29 to the fuselage of the craft 11.

Furthermore, from the aforesaid it will be seen that while the rotor hub 15 is mounted to be rotatable and tiltable in any direction, the ring 19 is not rotatable but is tiltable with the rotor hub as is the shell 27. Shell 28 affords a bearing surface for the shell 27, thereby serving as a means of transmitting lift from the shell 27 to the fuselage 11 of the craft.

In the shell 28 are located a plurality of ports such as 35 and 36. The port 35 serves as an opening through which lubricating substances may be supplied to maintain an oil film between the bearing surfaces 27 and 28. Port 36, on the other hand, provides a spray of lubricating substances for the purpose of lubricating the mechanisms within the spherical segments directly above thereto, which will be later described herein.

Pump 37 located within the fuselage 11 serves to circulate oil and build up oil pressure between the bearing surfaces through the lines 38 and 39, the latter line serving as a return line to return the oil to the sump 42.

A third shell 43 partially surrounds the shell 27 to provide a drip pan for the oil. This member 43 has provided in it a ring 44 containing a material such as felt for sealing the drip pan from the outside for all conditions of tilt of shell 27. This drip pan 43 is rigidly attached to the fuselage in a way similar to the manner in which shell 28 is attached to the fuselage.

Cyclical pitch and collective pitch control are provided within the shell 27. Due to the flexible arrangement of the instant invention, novel means for varying pitch from a point external to the shell 27 are provided. Thus, for collective pitch control, a flexible shaft 45 acting through a gear mechanism 46 imparts rotation to the shaft 47 through which a bevel gear 48 imparts rotation to a cylindrical member 49. The member 49 is suitably secured to a boss integral with the ring 19 and extending downwardly therefrom into the cavity formed by the spherical members 27 and 28. This cylindrical member 49 has a plurality of angularly disposed grooves, such as is illustrated at 51, and placed within these angularly disposed grooves are a plurality of pins 52 mounted on the spherical segment 53 and disposed in a manner that rotation of the cylindrical member 49, provides movement of these pins within the angularly disposed grooves 51 which will cause these pins to be uniformally raised vertically. These pins 52 being rigidly attached to the spherical segment 53 cause this spherical segment to be vertically moved therewith as is desired for collective pitch change.

Thus, by rotation of the shaft 45 the spherical member 53 is raised or lowered as is desired. Within the spherical segment 53 is a mating spherical segment 54 (better viewed in Fig. 4). This inner spherical member 54 has disposed thereon at 90 degree displacement, two curved inner gear rack segments 55—55. The inner spherical segment 54 is arranged to fit within the outer spherical segment 53 in a manner permitting relative tilt therebetween. This relative tilt is produced through the rotation of the worm gear 61 which is caused to rotate by action of the bevelled gears 62 and 63 responsive to rotation of the shaft 64 to the gearing arrangement 65 and thence, to a flexible shaft 66. Each of the gears 62 is keyed or splined on its respective shaft, as indicated in Fig. 2, so that it may slide longitudinally thereon and yet maintain driving engagement with its respective gear 63 throughout the range of vertical movement of the shaft and its associated worm 61 which are raised and lowered with spherical member 53 during changes in collective pitch. As there are two such arrangements (only one being shown in Fig. 2), acting on the inner spherical member 54, rotation of two shafts such as 66 at 90° to each other will cause the inner spherical member 54 to tilt relative to the outer spherical member 53. Disposition of the shafts 66 relative to the longitudinal and lateral axes of the aircraft is governed by consideration of the gyroscopic properties of the rotating elements, and may be angularly displaced approximately 90° contra to the direction of rotation of the rotor. In this manner the tilt of the virtual axis produced by the cyclic pitch mechanism will be in accordance with the movements of pilot's control stick.

Mounted within the inner spherical member 54 is a cylindrical ring 71 rigidly affixed thereto. This cylindrical segment or ring 71 mounts a ball bearing 72, which, in turn, is arranged on the periphery of a second cylindrical ring 73. This second cylindrical ring 73 is free to rotate within the first cylindrical member 71 but is tiltable in response to the tilt of the first cylindrical member 71 because of the connecting ball bearing 72. Cylindrical member 73 is, however, connected to be rotatable with the rotor through the connecting torque arm 74, hung from the inside of rotor hub 15 as by stub shaft 74' (see Fig. 3). The pivot 75 and the arm 76 extending therefrom having a ball 67 mounted within a socket 77 which, in turn, is rigidly mounted on the inner cylindrical member 73. Thus, as the shaft 12 rotates, that rotation is imparted to the arm 74 through the arm 76 to the cylindrical member 73, and the connecting pivot at 75 permits undisturbed rotation of the cylindrical member 73 for any position of tilt of the rotor hub 15. The elements 71, 72 and 73 together form a swash plate assembly for adjusting the vertical movement of the rods 81, and thus the pitch of the wings. This swash plate assembly is conveniently enclosed in the cavity formed by the members 27 and 28.

Disposed in equal spacing on the cylindrical ring 73 are a plurality of rods 81 which extend therefrom to an offset arm 82 of a rotary wing segment 83. These connecting rods 81 serve to move the rotating wing 83 in pitch.

As hereinbefore mentioned, the wings 83 are pivotally mounted on the stub shafts 16 to be movable in pitch. This motion in pitch is transmitted from the rotating inner cylindrical member 73 through the rods 81 to the offset arm of the wing 83, thereby producing desired cyclical pitch variations.

From the aforesaid, it can be seen that when collective pitch control is desired, the outer spherical member 53 is raised or lowered in response to the desired setting of the shaft 45 causing the rods 81 to collectively change the pitch setting of the rotating wings 83. However, when cyclical pitch control is desired, the inner spherical member 54 is tilted relative to the outer spherical member 53, thereby displacing the rods 81 in a nonuniform manner and consequently, causing cyclical pitch variations to be applied to the wings 83.

While on smaller ships, it appears that the type of wings set forth in Fig. 3, namely, the single segment type, appear to be most advantageous, in larger craft, having a large rotor diameter, constructional limitations might prevent the incorporation of this type of wing. Therefore, for a larger craft, a wing, including two segments having equal spanwise stiffness, is provided wherein an inner segment 181 is of the stressed skin type construction having a through box spar 101 as is illustrated in Fig. 7. The three inner wing sections, or roots are rigidly united at the hub with a built in optimum pitch angle A to be determined from the characteristics desired in the particular construction involved, the outer wing segments are a fractional length of the inner wing segments, the outer wing segments preferably being one-half as long as the inner wing segments.

The inner segment 181, hereinabove pointed out, is rigidly affixed to the rotor hub 15 and is tiltable therewith but is not capable of pitch variations. However, an outer wing segment 182 is provided and is movable about a quarter chord pitch axis which affords pitch variations in a manner to be hereinafter described.

If the two segmental wing construction is used in conjunction with the rotor hereinbefore set forth, the mechanisms within the rotor hub would be identical to that hereinbefore described, the only change being in the wing construction. Thus, the pitch control rods 81 extend upwardly through the rotor hub 15 and serve to displace lever arm 111. The arm 111 is rotatably mounted on a shaft 150 and rotates the lever arm 112 through a suitable sleeve connection depending upon the direction of rotation of arm 111. The lever arm 112 has connected to its lower end, a rod 113 which controls the position of the valving element of control valve 114 which forms part of a booster mechanism for augmenting the control force to the outer wing segment 182. Movement imparted by lever 111 therefore operates the control valve 114 to allow fluid pressure from line 114' to enter the master cylinder 115, thereby causing its piston and piston rod 116 to rotate a drum or double ended sector 119 through a lever 118 operatively connected thereto. A hydraulic pump 141 is provided for supplying fluid power to the booster mechanism just described. This pump may be located within each of the inner wing sections or segments and derives its driving power from a ring gear 142 which is secured to the upper surface of ring 19. Therefore, as the inner wing rotates, the pump 141 rotating therewith is empowered by rotation of a suitable gear connection 143 as it rotates around the fixed ring gear 142. Suitable fluid connections 144 are provided to both supply fluid to the pump 141 from the pool of oil serving as a sump for the booster mechanism which may be maintained within the bowl member 27, 28 as above described, and to exhaust fluid from the master cylinder 115 to the pool or sump. Also, fluid connection 114' connects control valve 114 with the pump 141. Thus there is provided a booster mechanism completely enclosed within the inner wing segment for augmenting the rotational force originally supplied by the pitch control rods 81.

This sector member 119 is double ended and has a flat steel tape 121 attached at the top and bottom of the sector member 119. As the tape 121 is displaced upon rotation of sector 119, translatable members 122, which are rigidly attached to the tape 121 and are located at the outer extremity of the inner wing segment 181, are moved either inwardly or outwardly. Each of these members 122, is provided with an angular or inclined groove 123 carved in the periphery thereof, and these grooves receive the pins 124 that are located on the inner side of a sleeve 132 which fits over the members 122 thereby causing rotation of the sleeve 132 whenever the members 122 are translated or displaced inwardly or outwardly parallel to the longitudinal axis of the wing.

Sleeve 132 rigidly mounts thereon the outer wing segment 182 and whenever the sleeve 132 rotates the outer wing segment 182 will rotate therewith. The inner side of the members 122 are provided with a rack gear 133 which mesh with the gear 134 located in a supporting member 135 to provide uniform displacement of the members 122. Thus, as the top member 122 moves outwardly, the bottom member 122 will be caused to be moved inwardly in response to motion transmitted through the gear 134. Thus, this gear coordinates motion between the members 122. All parts of this pitch control from the pivot or fulcrum point of lever arm 118, including the steel tapes and gear 134 are designed to carry a major part of the running load due to centrifugal force. This motion transmitting means between member 119 and the pivotal mounting 132 of the rotor wing permits freedom of rotation of the outer wing portion 182 but at the same time resists the outward force on the pivotal mounting generated by centrifugal action.

In order to obtain information relative to the attitude of the outer wing, a vertical gyro 56, of any well-known type, may be mounted on the ring 19. This vertical gyro may have roll and pitch pickoffs of a sort well known to the art which will provide a signal to instruments in the cabin of the aircraft, giving very accurate information as to the position of the plane of the outer wing tips. These signals may be utilized for many purposes. Flight instruments responsive to such signals and of types well known to the art may be provided to indicate relative tilt and this relative tilt would be absolute in the sense that it would not be affected by spurious fuselage motion. Hence, while heretofore much effort was expended in attempting to cancel out the effect of fuselage pendulous motion, this type of spurious motion does not affect the instant arrangement. Therefore a greatly simplified solution to the problem of measuring the angle the virtual axis of rotation makes with respect to the true vertical is obtained.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an aircraft of the rotary wing type, a rotor mounted to be tiltable in any direction and having wings pivotally mounted for movement about their longitudinal axis, a member in the form of a hollow spherical segment having an inner bearing surface mounted on said rotor to be tiltable therewith, means connecting the member and the aircraft to prevent the rotation of the member relative to the aircraft, a second member in the form of a spherical segment mounted on the aircraft fuselage having an outer bearing surface concentric with and mating with the inner bearing surface of the first member, and a third member partially surrounding the second member to provide a space therebetween for receiving the first member, the third member serving to enclose the bearing surface.

2. A rotor head for rotary wing aircraft comprising a rotor hub having a plurality of sustaining wings radially and pivotally mounted thereon for adjustment in pitch, driving means connected to the hub by a universal coupling for rotating the rotor hub, first and second interfitting spherical segment members having a common center coincident with the center of the universal coupling, the first member being secured to the craft and having means for journaling the driving means, means between the second member and the hub whereby the hub is rotatably mounted with respect to the second member, means connecting the second member and the craft for preventing rotation of the second member, swash plate means rotatably supported on said second member and within the spherical segment members for adjusting the pitch of the wings, and means connected between the swash plate means and the aircraft for controlling the operation of the swash plate means, said last recited means being anchored in the second member whereby the pitch adjusting means is rendered independent of the attitude of the aircraft.

3. A rotor head for rotary wing aircraft comprising a rotor hub having a plurality of sustaining wings pivotally mounted thereon for adjustment in pitch, driving means including a universal joint for rotating the hub, first and second interfitting spherical segment members having a common axis coincident with the axis of the universal connection, the first member being secured to the craft and having means for journaling the driving means, means between the second member and the hub whereby the hub is rotatably mounted with respect to the second member, means connected between the second member and the aircraft to prevent rotational movement of the second member about the axis of the driving means but allowing relative tilt therebetween, a swash plate rotatably supported on said second member, means connecting the swash plate and the wings to adjust the pitch thereof, means to raise and lower the swash plate along an axis coincident with the axis of the driving means to adjust the collective pitch of the wings, means to tilt the swash plate relative to the axis of the driving means to adjust the cyclic pitch of the wings, and means connected between the swash plate and the aircraft including the last two named means to control the movement of the swash plate whereby the pitch adjusting means is rendered independent of the attitude of the aircraft.

4. Apparatus as defined in claim 3, wherein the means for adjusting the swash plate for collective pitch control comprises a first ring rotatably mounted in the second member and having a plurality of inclined slots therein, a second ring supporting the swash plate and having a plurality of pins each engaging a corresponding slot in the first ring, and means actuated by the swash plate adjusting means and connected to the first ring for rotating the first ring relative to the second ring thereby to raise and lower the second ring relative to the first ring.

5. Apparatus as set forth in claim 3, wherein the means for adjusting the swash plate for cyclic pitch control comprises a first ring fixed in tilt relative to the hub, a second ring tiltably mounted within the first ring rotatably supporting the swash plate, a rack and worm connection between the second and first rings respectively for effecting relative movement therebetween, the rack being disposed substantially parallel to the axis of rotation of the swash plate, whereby rotation of the worm will cause tilting of the swash plate relative to the axis, and means actuated by the swash plate controlling means to rotate the worm.

6. In a rotary wing aircraft having a rotor hub with a plurality of sustaining wings pivotally mounted thereon for adjustment in pitch, a swash plate, a pitch adjusting arm for each of the wings pivotally connected to the swash plate, means to adjust the swash plate relative to the hub comprising a first ring axially fixed relative to the hub and having a plurality of inclined slots therein, a second ring rotatably supporting the swash plate and having a plurality of pins each engaging a corresponding slot in the first ring, and means associated with the aircraft and connected to the first ring to rotate the first ring relative to the second ring whereby to raise and lower the swash plate relative to the hub.

7. In a rotary wing aircraft having a rotor hub with a plurality of sustaining wings pivotally mounted thereon for adjustment in pitch, a swash plate, a pitch adjusting arm for each of the wings pivotally connected to the swash plate, means for adjusting the swash plate relative to the hub comprising a first ring fixed in tilt relative to the hub, a second ring rotatably supporting the swash plate and tiltably mounted within the first ring, and means connected between the rings for tilting the second ring relative to the first ring whereby to tilt the swash plate relative to the hub.

8. Pitch adjusting mechanism for the sustaining wing of a rotary wing aircraft having an inner wing section fixed to the rotor hub of the aircraft, an outer wing section, and means pivotally mounting the outer wing section to the inner wing section for adjustment in pitch about a longitudinal wing axis comprising pitch adjusting control mechanism within the hub for controlling the pitch adjustment of the outer wing section, a drum member pivotally mounted within the inner wing section adjacent the hub for rotation about an axis perpendicular to the longitudinal axis and adapted to be rotated by the pitch adjusting control mechanism, means translatable in directions parallel to the longitudinal axis at the end of the inner wing section adjacent the pivotal mounting means having slots therein inclined relative to the longitudinal axis, pins on the outer wing section disposed within the slots for rotating the outer wing section upon translation of the translatable means, and tension means connecting the drum and the translatable means for transmitting the motion of the pitch adjusting means to the outer wing portion.

MORTIMER F. BATES.

REFERENCES CITED

The following references are of record in the file of this patent:

UNITED STATES PATENTS

| Number | Name | Date |
|---|---|---|
| 1,294,361 | Nash | Feb. 11, 1919 |
| 1,701,762 | Pitcairn | Feb. 12, 1929 |
| 2,021,470 | Upson | Nov. 19, 1935 |
| 2,023,105 | Smith | Dec. 3, 1935 |
| 2,068,617 | Wilford et al. | Jan. 19, 1937 |
| 2,108,839 | Wilford et al. | Feb. 22, 1938 |
| 2,162,794 | Von Osboth | June 20, 1939 |
| 2,163,893 | Schairer | June 27, 1939 |
| 2,164,678 | Bennett | July 4, 1939 |
| 2,216,080 | Johnson | Sept. 24, 1940 |
| 2,216,164 | Schairer | Oct. 1, 1940 |
| 2,368,698 | Young | Feb. 6, 1945 |
| 2,376,523 | Synnestvedt | May 22, 1945 |
| 2,410,609 | Pecker | Nov. 5, 1946 |
| 2,410,963 | De Chappedelaine | Nov. 12, 1946 |
| 2,425,651 | Stalker | Aug. 12, 1947 |
| 2,529,479 | Bates | Nov. 14, 1950 |

FOREIGN PATENTS

| Number | Country | Date |
|---|---|---|
| 851,766 | France | Oct. 9, 1939 |